US006872773B2

(12) United States Patent
Pakusch et al.

(10) Patent No.: US 6,872,773 B2
(45) Date of Patent: Mar. 29, 2005

(54) PREPARATION OF READILY WATER-REDISPERSIBLE AND WATER-WETTABLE POLYMER POWDERS

(75) Inventors: Joachim Pakusch, Speyer (DE); Ines Pietsch, Speyer (DE); Hans-Jürgen Denu, Friedelsheim (DE); Heinrich Sack, Hassloch (DE); Bernd Reck, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/815,870

(22) Filed: Apr. 2, 2004

(65) Prior Publication Data

US 2004/0198896 A1 Oct. 7, 2004

(30) Foreign Application Priority Data

Apr. 3, 2003 (DE) ......................................... 103 15 433

(51) Int. Cl.⁷ ......................... C08L 33/08; C08L 33/10; C08L 33/12
(52) U.S. Cl. ....................... 524/560; 524/493; 524/561; 524/562; 524/563; 524/567; 524/568; 524/571; 524/572; 524/575; 524/577
(58) Field of Search ................................ 524/493, 560, 524/561, 562, 563, 567, 568, 571, 572, 575, 577

(56) References Cited

U.S. PATENT DOCUMENTS

| 3,287,290 | A | * | 11/1966 | Bray, Jr. ....................... 524/46 |
| 3,883,489 | A | * | 5/1975 | Matschke et al. ........... 524/427 |
| 4,481,328 | A | | 11/1984 | Harreus et al. |
| 6,020,403 | A | * | 2/2000 | Eck et al. .................... 523/340 |
| 6,291,573 | B1 | * | 9/2001 | Pakusch et al. ............. 524/503 |
| 6,403,677 | B1 | * | 6/2002 | Walker ........................ 523/206 |
| 6,489,381 | B1 | * | 12/2002 | Dreher et al. .................. 524/5 |

FOREIGN PATENT DOCUMENTS

| DE | 17 19 317 | 3/1972 |
| DE | 26 14 261 | 10/1977 |
| DE | 31 01 413 | 7/1982 |
| DE | 195 42 442 | 5/1997 |
| DE | 197 11 712 | 9/1998 |
| EP | 1 000 113 | 5/2000 |
| GB | 1 206 501 | 9/1970 |
| GB | 1 559 637 | 6/1980 |
| WO | WO 99/06474 | 2/1999 |

* cited by examiner

Primary Examiner—Judy M. Reddick
(74) Attorney, Agent, or Firm—Oblon, Spivak, McClelland, Maier & Neustadt, P.C.

(57) ABSTRACT

A readily water-redispersible and water-wettable polymer powder is prepared by spray-drying of an aqueous dispersion of polymer particles with admixing of a hydrophilic and of a hydrophobic antiblocking agent.

12 Claims, No Drawings

PREPARATION OF READILY WATER-REDISPERSIBLE AND WATER-WETTABLE POLYMER POWDERS

BACKGROUND OF THE INVENTION

1. Field of the Invention

The present invention relates to a process for the preparation of a readily water-redispersible and water-wettable polymer powder by spray-drying of an aqueous dispersion of polymer particles with admixing of a hydrophilic and of a hydrophobic antiblocking agent, wherein the spray-drying of the aqueous polymer particle dispersion is carried out in the presence of a hydrophobic antiblocking agent and the polymer powder obtained is homogeneously mixed with a hydrophilic antiblocking agent in a subsequent step.

2. Description of the Background

In many applications, polymers which can be incorporated into an aqueous medium in a simple manner are required. In many cases, aqueous dispersions of polymer particles (aqueous polymer dispersions) which can often be used directly are suitable for this purpose. A disadvantage of aqueous polymer dispersions, however, is that, with a water content of up to 60% by weight, they require large volumes during storage and, on transfer to the customers, water cheaply available everywhere also has to be transported at high costs in addition to the desired polymer.

This problem is frequently solved by subjecting the aqueous polymer dispersions, which are obtainable, inter alia, by a free radical aqueous emulsion polymerization familiar to a person skilled in the art, to a spray-drying process, likewise familiar to a person skilled in the art, for the preparation of corresponding polymer powders.

With the use of these polymer powders, for example as binders in adhesives, sealing compounds, synthetic resin renders, paper coating slips, surface coating compositions and other coating materials or as additives in mineral binders, the polymer powders must as a rule be redispersed in water. This can be effected either by redispersing the polymer powder in water and using the resulting aqueous polymer dispersion for mixing with the other formulation components or by mixing the polymer powder together with the other formulation components with water. In both cases, it is important that the polymer powder forms the original polymer particles again rapidly and without formation of agglomerates when brought into contact with water. The basis for this is the instant behavior of the polymer powder used in water, which behavior comprises the redispersing behavior and the wetting behavior of the polymer powder.

The redispersing behavior is an important property for the quality of the polymer powder. The better the redispersing behavior of the polymer powder in water, the more closely the properties of the aqueous polymer dispersion after redispersing approach the properties of the aqueous polymer dispersion prior to the spray-drying step. This means that the redispersing behavior of the polymer powder is a measure of the extent to which the original and the redispersed aqueous polymer dispersions correspond in their properties.

If the polymer powder also has good wetting behavior, the aqueous polymer dispersion can form during the redispersing even without the use of an intensive mixing technique, which has advantages in practice.

While the redispersing behavior of a polymer powder is generally substantially influenced by the spraying assistants usually used in the spray-drying process and therefore familiar to a person skilled in the art, the wetting behavior is determined by the surface characteristics of the polymer powder particle. This is frequently determined by the antiblocking agent adhering to the surface of the polymer powder particle.

As antiblocking agents, DE-A-2614261 discloses, for example, finely divided silicas, which are used in amounts of from 4 to 20% by weight, based on the polyvinyl acetate/ethylene copolymers. However, powders produced in this manner have a large fine fraction and therefore tend to form dust. Furthermore, these polymer powders tend to agglomeration on introduction into water, which agglomeration can be eliminated only by an intensive mixing process.

DE-A-2614261 describes, in a similar process, the use of from 2 to 20% by weight of silica as an antiblocking agent for polyvinyl acetate and other copolymers of vinyl acetate. Here too, the abovementioned disadvantages are applicable.

DE-A-1719317 discloses, as antiblocking agents, aluminum silicates, kieselguhr, clays, calcium sulfate, cements or diatomaceous earth, which are mixed with the polymer powder after the spray-drying process, the abovementioned disadvantages being applicable here too.

Silicas rendered hydrophobic by reaction with chlorosilane are disclosed in DE-A 3101413 as advantageous antiblocking agents in the preparation of vinyl ester powders.

EP-A 1000113 describes a process for the preparation of redispersible and wettable polymer powders, in which a hydrophilic and a hydrophobic antiblocking agent are to be used simultaneously for the spray-drying. This process is said not to have the abovementioned disadvantages. A disadvantage of this process, however, is that large amounts of antiblocking agents are added during the spray-drying process, which, owing to the finely divided nature of the antiblocking agents used, frequently leads to deposits or to blockages of the waste air pipes or separation cyclones or waste air filters, with the result that the spray-drying process is susceptible to faults.

SUMMARY OF THE INVENTION

It is an object of the present invention to provide an improved process for the preparation of polymer powders having good redispersing and wetting behavior in water by spray-drying of aqueous polymer dispersions.

DETAILED DESCRIPTION OF THE PREFERRED EMBODIMENTS

We have found, surprisingly, that this object is achieved by the process defined at the outset.

Aqueous polymer dispersions are generally known. They are fluid systems which contain, as the disperse phase in an aqueous dispersing medium, polymer balls consisting of a plurality of polymer chains entangled with one another, i.e. the polymer matrix or polymer particles. The weight average diameter of the polymer particles is frequently from 10 to 1 000 nm, often from 50 to 500 nm or from 100 to 300 nm.

Aqueous polymer dispersions are obtainable in particular by free radical aqueous emulsion polymerization of ethylenically unsaturated monomers. This method has been widely described in the past and is therefore specially well known to a person skilled in the art [cf. e.g. Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol. 1, pages 33 to 415, Chapman &

Hall, 1997; H. Warson, The Applications of Synthetic Resin Emulsions, pages 49 to 244, Ernest Benn, Ltd., London, 1972; D. Diederich, Chemie in unserer Zeit 24 (1990), 135 to 142, Verlag Chemie, Weinheim; J. Piirma, Emulsion Polymerisation, pages 1 to 287, Academic Press, 1982; F. H ölscher, Dispersionen synthetischer Hochpolymerer, pages 1 to 160, Springer-Verlag, Berlin, 1969 and the patent DE-A 40 03 422]. The free radical aqueous emulsion polymerization is usually effected by a procedure in which the ethylenically unsaturated monomers are dispersed in an aqueous medium, frequently in the presence of dispersants, and are polymerized by means of at least one free radical polymerization initiator. Frequently, in the aqueous polymer dispersions obtained, the residual contents of unconverted monomers are reduced by chemical and/or physical methods likewise known to a person skilled in the art [cf. for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by dilution or concentration or further conventional additives, for example bactericidal or antifoam additives, are added to the aqueous polymer dispersion.

The novel process can be carried out in particular with aqueous polymer dispersions whose polymer particles contain from 50 to 99.9% by weight of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate, vinyl esters of versatic acid, vinyl esters of long-chain fatty acids and/or ethylene in the form of polymerized units.

According to the invention, it is possible to use in particular those aqueous polymer dispersions whose polymers contain from 0.1 to 5% by weight of at least one α,β-monoethylenically unsaturated mono- and/or dicarboxylic acid of 3 to 6 carbon atoms and/or the amide thereof and from 50 to 99.9% by weight of at least one ester of acrylic and/or methacrylic acid with alkanols of 1 to 12 carbon atoms and/or styrene, or from 0.1 to 5% by weight of at least one α,β-monoethylenically unsaturated mono- and/or dicarboxylic acid of 3 to 6 carbon atoms and/or the amide thereof and from 50 to 99.9% by weight of styrene and/or butadiene, or from 0.1 to 5% by weight of at least one α,β-monoethylenically unsaturated mono- and/or dicarboxylic acid of 3 to 6 carbon atoms and/or the amide thereof and from 50 to 99.9% by weight of vinyl chloride and/or vinylidene chloride, or from 0.1 to 5% by weight of at least one α,β-monoethylenically unsaturated mono- and/or dicarboxylic acid of 3 to 6 carbon atoms and/or the amide thereof and from 40 to 99.9% by weight of vinyl acetate, vinyl propionate, vinyl esters of versatic acid, vinyl esters of long-chain fatty acids and/or ethylene in the form of polymerized units.

According to the invention, it is possible to use those polymers whose glass transition temperature is from −60 to +150° C., often from −30 to +100° C., frequently from −20 to +50° C. The glass transition temperature ($T_g$) is understood as meaning the limit of the glass transition temperature into which said glass transition temperature tends according to G. Kanig (Kolloid-Zeitschrift & Zeitschrift für Polymere, Vol. 190, page 1, equation 1) with increasing molecular weight. The glass transition temperature is determined by the DSC method (differential scanning calorimetry, 20 K/min, midpoint measurement, DIN 53 765).

According to Fox (T. G. Fox, Bull. Am. Phys. Soc. 1 (1956) [Ser. II], 123 and according to Ullmann's Encyclopadie der technischen Chemie, Vol. 19, page 18, 4th edition, Verlag Chemie, Weinheim, 1980) the following is a good approximation for the glass transition temperature of at most slightly crosslinked copolymers:

$$1/T_g = x^1/T_g^1 + x^2/T_g^2 + \ldots x^n/T_g^n,$$

where $x^1, x^2, \ldots x^n$ are the mass fractions of the monomers $1, 2, \ldots n$ and $T_g^1, T_g^2$, are the glass transition temperatures, in degrees Kelvin, of the polymers composed in each case of only one of the monomers $1, 2, \ldots n$. The $T_g$ values for the homopolymers of most monomers are known and are stated, for example, in Ullmann's Encyclopedia of Industrial Chemistry, 5th edition, Vol. A21, page 169, Verlag Chemie, Weinheim, 1992; further sources of glass transition temperatures of homopolymers are, for example, J. Brandrup, E. H. Immergut, Polymer Handbook, 1$^{st}$ Ed., J. Wiley, New York, 1966; 2$^{nd}$ Ed., J. Wiley, New York, 1975 and 3$^{rd}$ Ed., J. Wiley, New York, 1989.

The antiblocking agents are as a rule powders of inorganic solids, having a mean particle size of from 0.1 to 20 μm, frequently from 1 to 10 μm (based on ASTM C 690-1992, Multisizer/100 μm capillary). It is advantageous if the inorganic substances have a solubility of ≦50 g/l, ≦10 g/l or ≦5 g/l in water at 20° C.

Examples are silicas, aluminum silicates, carbonates, such as calcium carbonate, magnesium carbonate or dolomite, sulfates, such as barium sulfate, and talcs, calcium sulfate, cements, calcium silicates or diatomaceous earth. Mixtures of the abovementioned compounds, for example micro-intergrowths of silicates and carbonates, are also suitable.

Depending on their surface characteristics, the antiblocking agents may have hydrophobic (water-repellent) or hydrophilic (water-attracting) properties. A measure of the hydrophobic or hydrophilic character of a substance is the contact angle of a drop of demineralized water on a compressed body of the corresponding antiblocking agent. The greater the contact angle of the water drop on the surface of the compressed body, the greater the hydrophobic character or the less the hydrophilic character, and vice versa. In order to decide whether one antiblocking agent is more hydrophobic or hydrophilic than another, standard sieve fractions (=the same particle sizes or particle size distributions) are prepared from the two antiblocking agents. Compressed bodies having horizontal surfaces are produced from these sieve fractions of the same sizes or size distributions under identical conditions (amount, surface area, pressure, temperature). A water drop is applied by means of a pipette to each compressed body and the contact angle between the surface of the compressed body and the water drop is determined immediately thereafter. The greater the contact angle between the surface of the compressed body and the water drop, the greater the hydrophobic character or the less the hydrophilic character.

In this document, the hydrophilic antiblocking agents are understood as meaning all those antiblocking agents which are more hydrophilic than the hydrophobic antiblocking agents used, i.e. their contact angles are smaller than those of hydrophobic antiblocking agents used in the spray process.

Frequently, the hydrophobic antiblocking agents have a contact angle of $\geq 90°$, $\geq 100°$ or $\geq 110°$, while the hydrophilic antiblocking agents have a contact angle of $<90°$, $\leq 80°$ or $\leq 70°$. It is advantageous if the contact angles of the hydrophobic and hydrophilic antiblocking agents used differ by $\geq 10°$, $\geq 20°$, $\geq 30°$, $\geq 40°$, $\geq 50°$, $\geq 60°$, $\geq 70°$, $\geq 80°$ or $\geq 90°$.

Hydrophilic antiblocking agents used are, for example, silicas, quartz, dolomite, calcium carbonate, sodium/aluminum silicates, calcium silicates or micro-intergrowths of silicates and carbonates, and hydrophobic antiblocking agents used are, for example, talc (magnesium hydrosilicate having a sheet structure), chlorite (magnesium/aluminum/iron hydrosilicates), silicas treated with organochlorosilanes (DE-A 3101413), or generally hydrophilic antiblocking agents which are coated with hydrophobic compounds, for example precipitated calcium carbonate coated with calcium stearate.

What is essential to the process is that from 0.001 to 10, often from 0.1 to 1, parts by weight of hydrophobic antiblocking agent and from 0.01 to 30, often from 1 to 10, parts by weight of hydrophilic antiblocking agent are used per 100 parts by weight of the polymer contained in the aqueous polymer dispersion. It is particularly advantageous if the ratio of hydrophobic antiblocking agent to hydrophilic antiblocking agent is from 0.001 to 0.25:1 or from 0.004 to 0.08:1.

Optimum results are obtained if aqueous polymer dispersions having a weight average particle size of from 100 to 1000 nm, often from 100 to 500 nm, are used and the ratio of the mean polymer powder diameter (after the spray-drying frequently from 30 to 150 $\mu$m, often from 50 to 100 $\mu$m; determined on the basis of ASTM C 690-1992, Multisizer/100 $\mu$m capillary) to the mean particle diameter of the hydrophobic and hydrophilic antiblocking agents is from 2 to 50:1 or from 5 to 30:1.

The spray-drying known to a person skilled in the art is effected in a drying tower with the aid of atomizer disks or airless high-pressure nozzles or binary nozzles in the top of the tower. The drying of the aqueous polymer dispersion is carried out using a hot gas, for example nitrogen or air, which is blown into the tower from below or above, but preferably from above cocurrently with the material to be dried. The temperature of the drying gas is from about 90 to 180° C., preferably from 110 to 160° C., at the tower entrance and from about 50 to 90° C., preferably from 60 to 80° C., at the tower exit. The hydrophobic antiblocking agent is introduced into the drying tower simultaneously with the aqueous polymer dispersion but spatially separately therefrom. The addition is effected, for example, via a binary nozzle or conveyor screw, as a mixture with the drying gas or via a separate orifice.

The polymer powder discharged from the drying tower is cooled to 20 to 30° C. and mixed with the hydrophilic antiblocking agent in a commercial mixer, for example a Nauta mixer, as available from numerous companies.

The polymer powders obtained according to the invention have a very good shelf-life and flowability. They produce little dust and can be redispersed in a simple manner in water without a great deal of mixing work. The polymer powders obtained are particularly suitable for use as binders in adhesives, sealing compounds, synthetic resin renders, paper coating slips, surface coatings and other coating materials or as additives in mineral binders.

EXAMPLES

1. Preparation of an Aqueous Polymer Dispersion D1

A mixture of 150.0 g of demineralized water, 5.6 g of a 20% strength by weight aqueous solution of an ethoxylated p-isooctylphenol (degree of ethoxylation 25), 0.5 g of a 35% strength by weight aqueous solution of a sodium salt of a sulfated and ethoxylated p-isooctylphenol (degree of ethoxylation 25), 3.9 g of a 10% strength by weight aqueous formic acid solution, 1.7 g of sodium bicarbonate and 3.4 g of a 20% strength by weight aqueous polyacrylamide solution was heated to 90° C. while stirring and under a nitrogen atmosphere. Thereafter, beginning at the same time and while maintaining the internal temperature of 90° C., an aqueous monomer emulsion consisting of 403.2 g of n-butyl acrylate, 140.0 g of styrene, 11.2 g of acrylamide, 5.6 g of methacrylamide, 8.4 g of a 20% strength by weight aqueous solution of an ethoxylated p-isooctylphenol (degree of ethoxylation 25), 11.5 g of a 35% strength by weight aqueous solution of a sodium salt of a sulfated and ethoxylated p-isooctylphenol (degree of ethoxylation 25) and 162.9 g of demineralized water was continuously added dropwise to this mixture in 2 hours and a solution consisting of 3.3 g of sodium peroxodisulfate and 90 g of water was continuously added dropwise to said mixture in the course of 2.5 hours. Thereafter, the reaction mixture was stirred for a further 2 hours at 90° C. and then cooled to 60° C. After addition of a solution of 1.1 g of tert-butyl hydroperoxide in 5.5 g of demineralized water, a solution of 0.6 g of sodium hydroxymethanesulfinate in 15 g of demineralized water was added at this temperature in the course of 1 hour and stirring was then effected for a further 30 minutes. Thereafter, cooling was effected to 20 to 25° C. (room temperature) and neutralization was carried out with 4 g of a 20% strength by weight aqueous calcium hydroxide suspension. A polymer dispersion having a solids content of 55.3% by weight, a light transmittance of 8% for a 0.01% strength by weight polymer dispersion at 20° C. and with a layer thickness of 2.5 cm (LT value) and a pH of 8.7 was obtained. The glass transition temperature (DSC midpoint) of the polymer was −15° C.

The aqueous polymer dispersion was then diluted to a solids content of 40% by weight with demineralized water.

2. Preparation of a Spraying Assistant S1

1.20 kg of naphthalene were initially taken under nitrogen at 85° C. in a reaction vessel and 1.18 kg of concentrated sulfuric acid (98% by weight) were added with constant stirring and cooling so that the internal temperature was always below 150° C. After the end of the addition, the reaction mixture was left to continue reacting for 5 hours at an internal temperature of from 140 to 150° C. The reaction mixture was then cooled to 50° C. and 0.80 kg of a 30% strength by weight aqueous formaldehyde solution was added a little at a time while maintaining an internal temperature of from 50 to 55° C. After the end of the addition, 0.70 kg of demineralized water was immediately added and the mixture was heated to 100° C. and left to continue reacting for 5 hours at this temperature. Thereafter, cooling was effected to 65° C. and a 30% strength by weight calcium hydroxide suspension in demineralized water was added until a pH of 8.0 had been reached. The solution was then filtered over a 200 μm sieve, and an aqueous solution S1 having a solids content of about 35% by weight was obtained.

The aqueous solution of the spraying assistant S1 was then diluted to a solids content of 20% by weight.

3. Spray-drying

Hydrophobic Antiblocking Agent

The hydrophobic antiblocking agent used was Sipernat® D 17 from Degussa. This is a precipitated silica having a specific surface area (based on ISO 5794-1, Annex D) of 100 $m^2/g$, a mean particle size (based on ASTM C 690-1992) of 7 μm and a tapped density (based on ISO 787-11) of 150 g/l, the surface of which had been rendered hydrophobic by treatment with special chlorosilanes.

Hydrophilic Antiblocking Agent 1

Hydrophilic antiblocking agent 1 used was an untreated precipitated silica having a specific surface area (based on ISO 5794-1, Annex D) of 190 $m^2/g$, a mean particle size (based on ASTM C 690-1992) of 7 μm and a tapped density (based on ISO 787-11) of 90 g/l (Sipernat® 22 S from Degussa).

Hydrophilic Antiblocking Agent 2

Hydrophilic antiblocking agent 2 used was a finely divided intergrowth of white talc with pure dolomite, having a specific surface area (Blaine 10) of 15 900, a mean particle size (based on ASTM C 690-1992) of 3.5 μ and a tapped density (based on ISO 787-11) of 900 g/l (Special Extender Naintsche SE Super from Luzenac Naintsch).

Determination of the Contact Angle 10 g of the antiblocking agent in the form of a fine powder were introduced into a metal cylinder having an internal diameter of 30 mm and a height of 20 cm. Thereafter, a ram (external diameter 29.5 mm) weighing 5 kg was inserted and the sample was stored for 2 hours at room temperature. The metal cylinder was then turned over and the flat, horizontal base of the metal cylinder was removed so that the compressed powder formed a horizontal surface. A drop of water was applied to the horizontal surface of the compressed powder by means of a pipette and the contact angle between the horizontal surface of the compressed body and the water drop was determined immediately thereafter. The contact angle was >90° in the case of Sipernat® D 17 and <45° in the case of Sipernat® 22 S and Special Extender Naintsch® SE Super.

Preparation of the Spray-dried Polymer Powder

The spray-drying was carried out in a Minor laboratory dryer from GEA Wiegand GmbH (Niro Business Area) with atomization using a binary nozzle and powder deposition in a fabric filter. The tower entrance temperature of the nitrogen was 130° C. and the exit temperature was 60° C. 2 kg of a spray feed were metered in per hour.

The spray feed was prepared by adding 1 part by weight of the dilute aqueous spray assistant solution S1 to 5 parts by weight of the dilute aqueous polymer dispersion D1 at room temperature and mixing homogeneously with stirring.

Novel Dispersion Powders 1 and 2

Simultaneously with the spray feed, 0.2% by weight, based on the solids content of the spray feed, of the hydrophobic antiblocking agent was metered continuously into the top of the spray-drying tower via a weight-controlled twin-screw conveyor.

The dry dispersion powder discharged from the spray-drying tower was mixed with 10% by weight, based on the amount of powder, of the hydrophilic antiblocking agent 1 or 2 in a glass vessel. The glass container was filled to 50% of its volume. The powder mixture was then homogeneously mixed by means of a tumble mixer for 15 minutes.

Comparative Example

The spray-drying was carried out according to the novel example, except that the total amount of the hydrophilic antiblocking agent 1 was also metered into the drying tower simultaneously with the hydrophobic antiblocking agent.

After only about 7 minutes, the spray feed throughput had to be decreased to 500 g per hour since, owing to the large amount of finely divided antiblocking agents introduced, the fine-mesh separation filters became blocked and the pressure difference, measured before and after the separation filter, increased considerably. Because the separation filter was completely blocked, the experiment was terminated after about 12 minutes.

4. Assessment of the Spray-dried Polymer Powders

Blocking Behavior 10 g of the spray-dried polymer powders were introduced into a metal cylinder having an internal diameter of 30 mm and a height of 20 cm. A ram having an external diameter of 29.5 mm, a horizontal ram surface and a weight of 5 kg was then inserted and the sample was stored for 24 hours at room temperature. The powder tablet formed was then slowly pressed out of the cylinder and assessed as follows:

Examples 1 and 2

No powder tablet, or powder tablet cannot be picked up with the fingers

Comparative Example

Powder tablet crumbles

Wettability 2 g of polymer powder are poured at room temperature from a height of 10 cm by means of a spatula onto a water surface measuring about 79 $cm^2$ (800 ml beaker) and are assessed as follows:

Examples 1 and 2

Both polymer powders spread rapidly, fill the entire surface of the water and sink to the bottom without forming lumps Comparative Example The polymer powder spreads slowly, and forms small islands on the surface of the water, which do not divide further even on sinking The priority document of the present application, DE Application No. 10315433.7, filed on April 3, 2003, is incorporated herein by reference.

We claim:

1. A process for the preparation of a readily water-redispersible and water-wettable polymer powder, comprising:

spray-drying an aqueous dispersion of polymer particles in the presence of a hydrophobic antiblocking agent, thereby preparing a dried polymer powder; and homogeneously mixing a hydrophilic antiblocking agent with the dried polymer powder product obtained to prepare said readily water-redispersible and water-wettable polymer powder.

2. The process as claimed in claim 1, wherein, in the process as defined, from 0.001 to 10 parts by weight of hydrophobic antiblocking agent and from 001 to 30 parts by weight of hydrophilic antiblocking agent, are employed per 100 parts by weight of polymer powder particles.

3. The process as claimed in claim 2, wherein the ratio of hydrophobic antiblocking agent to hydrophilic antiblocking agent ranges from 0.001 to 0.25:1.

4. The process as claimed in claim 1, wherein the polymer of the polymer particle dispersion comprises from 50 to 99.9% of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate, vinyl esters of versatic acid, vinyl esters of long-chain fatty acids and/or ethylene in the form of polymerized units.

5. The process as claimed in claim 1, wherein the polymer of the polymer particle dispersion has a glass transition temperature ranging from −60 to +150° C.

6. The process as claimed in claim 2, wherein the polymer of the polymer particle dispersion comprise from 50 to 99.9% of esters of acrylic and/or methacrylic acid with alkanols of 1 to 12 carbon atoms and/or styrene, or from 50 to 99.9% by weight of styrene and/or butadiene, or from 50 to 99.9% by weight of vinyl chloride and/or vinylidene chloride, or from 40 to 99.9% by weight of vinyl acetate, vinyl propionate, vinyl esters of versatic acid, vinyl esters of long-chain fatty acids and/or ethylene in the form of polymerized units.

7. The process as claimed in claim 1, wherein the hydrophobic antiblocking agent has a contact angle of $\geqq 90°$ and the hydrophilic antiblocking agent has a contact angle of $<90°$.

8. The process as claimed in claim 7, wherein the hydrophobic antiblocking agent has a contact angle of $\geqq 100°$ and the hydrophilic antiblocking agent has a contact angle of $\leqq 80°$.

9. The process as claimed in claim 8, wherein the hydrophobic antiblocking agent has a contact angle of $\geqq 110°$ and the hydrophilic antiblocking agent has a contact angle of $\leqq 70°$.

10. The process as claimed in claim 1, wherein the hydrophobic and hydrophilic antiblocking agents have contact angles that differ by $\geqq 10°$.

11. The process as claimed in claim 10, wherein the hydrophobic and hydrophilic antiblocking agents have contact angles that differ by $\geqq 20°$.

12. The process as claimed in claim 11, wherein the hydrophobic and hydrophilic antiblocking agents have contact angles that differ by $\geqq 30°$.

* * * * *